3,034,291
PROPELLANTS FOR ROCKET MOTORS
Emil O. Kalil, Brooklyn, N.Y., assignor to The M. W. Kellogg Company, Jersey City, N.J., a corporation of Delaware
No Drawing. Filed Mar. 3, 1949, Ser. No. 79,506
7 Claims. (Cl. 60—35.4)

The present invention relates to propellants for rocket motors and more particularly relates to bipropellants comprising a fuel and an oxidant therefor that ignite spontaneously upon contact with each other.

Rocket motors can be powered by several general types of propellants. For example, the propellant can be a solid, it can be a single liquid or gas, or it can be a bipropellant comprising a normally liquid or gaseous fuel and a normally liquid or gaseous oxidant. When normally gaseous fuels and/or oxidants are employed, it is customary to supply them to the rocket motor in liquid form. Bipropellants comprising a liquid fuel and a liquid oxidant provide certain definite advantages over other types of propellants. For example, a liquid bipropellant makes it possible to provide, in a relatively small space, a rocket motor with sufficient propellant for a relatively long run, the propellant is not dependent upon oxygen from the atmosphere to support combustion, and the two liquids can be supplied to the rocket motor at predetermined rates and ratios by means of pumps or pressurized containers.

When a liquid bipropellant is used, the two fluids are injected into the rocket thrust cylinder substantially simultaneously, or with the oxidant slightly in advance of the fuel, and in finely atomized or gaseous form. Combustion takes place in the thrust cylinder to develop a large volume of gas therein which is under considerable pressure, and it is this gas escaping from the thrust cylinder which propels the rocket motor.

It is of great importance that the two components of a bipropellant ignite substantially immediately upon their contact with each other in the thrust cylinder of the rocket motor if hard starts are to be eliminated and reliable operation obtained. When the two components comprising a bipropellant ignite spontaneously substantially after coming in contact with each other easy, predictable, dependable, and reproducible starts are assured, and in addition there is no danger that combustion once started will stop.

It is accordingly one object of the present invention to provide a composition which will ignite spontaneously when contacted by selected oxidizing agents.

It is another object of the present invention to provide a relatively low cost efficient rocket fuel capable of igniting spontaneously upon contact with an oxidant and which has a freezing point lower than the ambient temperature at which the rocket it is employed in must operate.

It is another object of the present invention to provide a bipropellant for a rocket motor that ignites spontaneously when the two elements thereof are brought into contact with each other.

Other objects of the invention will in part be obvious and will in part appear hereinafter.

The invention accordingly comprises the product possessing the features, properties and relation of components which are exemplified in the following detailed disclosure, and the scope of the application of which will be indicated in the claims.

For a fuller understanding of the nature and objects of the invention, reference should be had to the following detailed description.

The present invention provides a fuel for a rocket motor comprising a relatively stable liquid to which there has been added a material capable of changing the stability characteristics of said liquid to make it capable of igniting spontaneously upon contact with a suitable oxidant.

Anhydrous ammonia is a well-known and highly effective fuel for use in rocket motors inasmuch as it reacts favorably with the normally used oxidants, for example, a highly concentrated solution of nitric acid, or white fuming nitric acid, or red fuming nitric acid, to give high thrust characteristics to the motor employing it. Ammonia possesses further advantages in that it is relatively inexpensive and safe and is relatively easy to obtain and store.

A major objection to the use of anyhdrous ammonia and an oxidant as a bipropellant for a rocket motor has been the difficulty experienced in igniting the two fluids in the thrust cylinder of the rocket motor and, upon some occasions, in maintaining the reaction between the two fluids once ignition has started. Prior to the present invention it was necessary to provide a thrust cylinder of a rocket motor, adapted to employ such a bipropellant, with some auxiliary ignition means, as for example, a spark plug, glow coil, or a pilot flame. The provision of such auxiliary ignition means made it necessary to equip the rocket motor with electric wiring and a source of electric power, or additional piping, valves, and a source of fuel for a pilot flame. All of these were cumbersome, consumed space, were a potential source of failure, and involved the addition of undesirable weight to the rocket motor, all obviously high undesirable in rocket motors primarily designed for airborne application.

I have found that a small quantity of one or more of a group of the alkaline-earth metals, comprising calcium and strontium, dissolved in anhydrous ammonia gives a fuel which ignites spontaneously substantially immediately upon contact with selected oxidants. The exact amount of calcium and/or strontium that must be dissolved in the anhydrous ammonia to give this result in a satisfactory practical operational way is quite small, and is in the order of .01%. For example, a solution of anhydrous ammonia and either calcium or strontium containing in the order of .01% of either of these metals by weight was ignited spontaneously upon contact with any one of the following oxidants, a 97% solution of nitric acid, white or red fuming nitric acid, at a temperature as low as —33° C. Anhydrous ammonia solutions of either calcium or strontium containing a higher concentration of these metals than .01% give equally satisfactory results. In fact, saturated solutions, wherein the ammonia has dissolved all of the calcium or strontium that it can contain, ignited spontaneously when contacted by nitric acid, and the combustion thus initiated continued satisfactorily. However, due primarily to economic considerations, and the speed and ease with which dilute solutions can be prepared, it is preferred to use a fuel containing only enough calcium or strontium to insure reliable ignition. For this purpose, as stated above, a solution containing in the order of .01% calcium and/or strontium is satisfactory.

It is possible to use smaller concentrations of calcium and strontium in many applications and obtain spontaneous combustion, as for example, when the ambient temperatures of the propellants are relatively high. Furthermore, it is often desirable to employ concentrations of calcium and strontium smaller than those that will give spontaneous combustion to impart desirable characteristics to the fuel, as for example, easy and reliable starts in rocket motors equipped with conventional starting devices.

The fuel of the present invention may be used in several different ways. For example, the entire fuel supply of a rocket motor may comprise a solution of anhydrous ammonia and calcium and/or strontium, or a small quantity of the ammonia-alkaline-earth metal solution can be placed in the supply line, preferably in a U-tube, leading from the supply of ammonia to the rocket motor, so that when the rocket motor is started the spontaneous combustible fuel will enter the thrust cylinder ahead of the anhydrous ammonia to contact the oxidant and start combustion. A sufficient quantity of the ammonia-alkaline-earth metal fuel is utilized to initiate the combustion reaction and to bring it to equilibrium. When this point is reached and the ammonia-alkaline-earth metal fuel exhausted the ammonia fuel immediately follows it into the thrust cylinder where it is ignited by the reaction, and combustion thus continues uninterrupted.

A third manner of using the fuel comprises dissolving the alkaline-earth metal in the ammonia immediately prior to its entry into the rocket motor thrust cylinder. This can be done by passing the anhydrous ammonia over a small quantity of calcium or strontium as the ammonia passes from its storage tank to the rocket thrust cylinder. The last mentioned method of providing and utilizing the fuel of the present invention in a rocket motor is preferred inasmuch as it does not make storage of the ammonia-alkaline-earth metal fuel necessary for any appreciable length of time. This is desirable because an ammonia solution of either calcium or strontium is unstable inasmuch as the calcium or strontium reacts with the ammonia to form an amide of either calcium or strontium.

My co-pending application Serial No. 79,507, filed the same day as this application, for "Propellants for Rocket Motors" discloses apparatus which may be employed to inject a predetermined quantity of the ammonia-alkaline-earth metal fuel of the present invention into a rocket thrust cylinder in advance of anhydrous ammonia, and an apparatus which may be used to dissolve the calcium or strontium in ammonia to provide the fuel of the present invention by flowing ammonia over either calcium or strontium as it passes from its storage tank to the rocket thrust cylinder.

The composition comprising the present invention has been specifically described in connection with a rocket motor. However, it will be obvious that the composition will have many applications other than in connection with rocket motors. Also, nitric acid has been specifically disclosed in the examples as the oxidant. Obviously, other oxidants may be used, as for example, peroxide or a mixture of nitric and sulfuric acids. It is not intended by reason of the above description to limit the invention to rocket motors.

Since certain changes may be made in the above fuel without departing from the scope of the invention herein involved, it is intended that all matter contained in the above description shall be interpreted as illustrative and not in a limiting sense.

What is claimed is:

1. The method of developing thrust in a reaction jet motor provided with a combustion chamber, by the combustion of bipropellant components comprising, injecting into the combustion chamber a fuel component consisting of anhydrous ammonia and an alkaline-earth metal selected from the group consisting of calcium and strontium, simultaneously with the injection of said fuel component injecting a nitric acid oxidizing component into said combustion chamber, and admixing said components to spontaneously ignite said components.

2. The method of developing thrust in a rocket motor having a combustion chamber by the combustion therein of bipropellant components comprising, injecting substantially simultaneously into the combustion chamber of the rocket motor an oxidizing component stream and a fuel component stream, intermixing said streams, said fuel component stream consisting of a solution of anhydrous ammonia and calcium, said oxidizing component stream consisting of nitric acid, whereby upon the intermixing of said streams spontaneous ignition thereof takes place.

3. The method of developing thrust in a rocket motor having a combustion chamber, by the combustion therein of bipropellant components comprising, injecting substantially simultaneously into the combustion chamber of the rocket motor an oxidizing component stream and a fuel component stream, intermixing said streams, said fuel stream consisting of a solution of anhydrous ammonia and strontium, said oxidizing stream consisting of nitric acid, whereby upon the intermixing of said streams spontaneous ignition thereof takes place.

4. The method of obtaining a jet for propulsion which comprises simultaneously injecting an oxidizing component stream and a fuel component stream into the combustion chamber of a reaction motor, intermixing said streams, said fuel component stream consisting of a solution of anhydrous ammonia and an alkaline-earth metal selected from the group consisting of calcium and strontium, wherein the alkaline-earth metal ranges from a trace to an amount sufficient to form a saturated solution, said oxidizing component stream consisting of nitric acid, whereby spontaneous ignition of said streams takes place upon intermixing thereof.

5. The method of rocket propulsion comprising simultaneously injecting a stream of oxidant and a stream of fuel into the combustion chamber of the jet motor, intermixing said streams, said fuel stream consisting of a solution of liquid anhydrous ammonia and an alkaline-earth metal selected from the group consisting of calcium and strontium, wherein the alkaline-earth metal ranges from about .01% by weight of said solution to an amount sufficient to form a saturated solution, said stream of oxidant consisting of nitric acid whereby said streams are spontaneously ignited upon contact with each other.

6. The method of generating propulsive thrust in the thrust cylinder of a reaction motor employing bipropellant components comprising simultaneously injecting a fuel component stream and an oxidizing component stream into the thrust cylinder of the reaction motor, and intermixing said streams, said fuel stream consisting of a solution of anhydrous ammonia and from a trace to slightly less than .01% by weight of said solution of alkaline-earth metal selected from the group consisting of calcium and strontium, said oxidizing stream consisting of nitric acid, said alkaline-earth metal being present in such proportion that said streams spontaneously ignite upon intermixing thereof.

7. The method of generating a propulsive thrust which comprises substantially simultaneously injecting a stream of nitric acid oxidizing agent into a combustion chamber and a stream of fuel solution consisting of anhydrous ammonia and in the order of .01% by weight of said solution of an alkaline-earth metal selected from the group consisting of calcium and strontium, and intermixing said streams to spontaneously ignite said streams.

References Cited in the file of this patent

Mellor: Comprehensive Treatise on Inorganic and Theoretical Chemistry, Longmans, Green and Co., N.Y., vol. 8 (1928), page 248; vol. 3 (1923), pages 637, 639.

Chemical Reviews, volume 20, pages 207 to 210 and 213 to 215, February 1937.

Chemical Reviews, vol. 20, p. 1928, February 1937.

Campbell et al.: JACS, vol. 67, pages 282 to 283 (1945).

Nature, vol. 159, pp. 811, 812, June 14, 1947.

Zucrow: Journal of the American Rocket Association, No. 72, December 1947, pages 26 to 44.